United States Patent

Gieshoff et al.

[11] Patent Number: 5,934,073
[45] Date of Patent: Aug. 10, 1999

[54] AUXILIARY HEATING FOR MOTOR VEHICLES WITH INTERNAL COMBUSTION ENGINES

[75] Inventors: Jürgen Gieshoff, Biebergemünd; Egbert Lox, Hanau; Thomas Kreuzer, Karben, all of Germany

[73] Assignee: Degussa Aktiengesellschaft, Frankfurt AM Main, Germany

[21] Appl. No.: 09/078,597

[22] Filed: May 14, 1998

[30] Foreign Application Priority Data

May 21, 1997 [DE] Germany ............................ 197 21 439

[51] Int. Cl.[6] ...................................................... F01N 3/02
[52] U.S. Cl. .................. 60/320; 60/286; 60/301; 60/303; 165/51; 165/52
[58] Field of Search .............................. 60/301, 286, 320, 60/298, 303; 165/51, 52; 237/12.3 A; 422/173

[56] References Cited

U.S. PATENT DOCUMENTS

| | | | |
|---|---|---|---|
| 4,426,844 | 1/1984 | Nakano | 60/295 |
| 5,033,264 | 7/1991 | Cabral | 60/274 |
| 5,207,990 | 5/1993 | Sekiya et al. | 422/183 |
| 5,320,523 | 6/1994 | Stark | 431/353 |
| 5,685,145 | 11/1997 | Sung et al. | 60/284 |

FOREIGN PATENT DOCUMENTS 2909530  11/1980  Germany ............................ 5/2

*Primary Examiner*—F. Daniel Lopez
*Assistant Examiner*—Binh Tran
*Attorney, Agent, or Firm*—Smith, Gambrell & Russell; Beveridge, DeGrande, Weilacher & Young

[57] ABSTRACT

An auxiliary heating system for a motor vehicle with an internal combustion engine. The auxiliary heating includes an emission control catalyst and a heat exchanger, integrated in the converter housing in front of and/or behind the catalyst, which provides the reaction heat released by the catalyst and the remaining heat of the exhaust gas to the heating of the passenger compartment. The heat generation may be increased by the injection of a fuel/air mixture before the catalyst and by using the catalyst as a catalytic burner and can be adapted to the heat requirements. The auxiliary heating of the invention prevents possible thermal damage of the catalyst during operation as a catalytic burner without many regulating elements by cooling the catalyst radiation. For this purpose, the heat exchanger is provided with an exchange surface which can freely exchange radiation with the radiant surface of the catalytic element.

18 Claims, 2 Drawing Sheets

AUXILIARY HEATING FOR MOTOR VEHICLES WITH INTERNAL COMBUSTION ENGINES

INTRODUCTION AND BACKGROUND

The present invention relates to auxiliary heating for motor vehicles with internal combustion engines.

To reduce fuel consumption, the efficiency of internal combustion engines is being continuously improved. As a consequence of this, the waste heat output of the motors, typically used to heat the passenger compartment, is decreasing. Particularly in the case of diesel-powered vehicles and hybrid vehicles, with a combination of an electro motor and an internal combustion engine, this leads to where the waste heat output is no longer sufficient for heating the passenger compartment, even during constant operation.

So-called auxiliary heaters are known which provide auxiliary heat during the cold start phase or also during partial load operation. Here, heat is produced by burning fuel with the aid of a flame burner. However, the disadvantage of this lies in increased fuel consumption as well as the formation of nitric oxides during the combustion process. Therefore, the use of such an auxiliary heater cancels out efforts towards improving engine efficiency. Moreover, additional problems arise while complying with emissions standards.

In order to comply with these limits, new vehicles are provided with emission control devices. They consist of a so-called converter housing which forms a part of the exhaust line of the vehicle. Inside the converter housing, emission control catalysts are provided which consist mostly of a monolithic block inside of which parallel flow channels for the exhaust gas are provided. The walls of the flow channels of these so-called honeycombs are provided with catalytically active coatings which convert harmful substances such as carbon monoxide, unburned hydrocarbons and nitric oxides contained in the exhaust gas of the combustion engine into carbon dioxide with a high degree of efficiency.

During the conversion of the harmful substances by the catalyst, combustion heat is released by the oxidation of carbon monoxide and the unburned hydrocarbons which also heat up the catalyst and the exhaust gas. When a large amount of harmful materials is present in the exhaust gas, the additional exothermal effect may lead to the destruction of the catalyst.

DE 39 20 159 A1 describes the heating of a motor vehicle by means of a catalytic converter with a heat exchanger. Here, the energy released during the catalytic conversion of a reaction mixture is utilized for heating purposes. Therefore, the catalytic converter is in the form of a heat exchanger or is located upstream from one. Prior to the start of the operation, the catalyst is heated by means of an electrical heater to the temperature necessary for conversion, whereby the output of harmful substances is minimized and simultaneously makes heat available very rapidly for heating purposes. By injecting fuel and by supplying combustion air before the catalytic converter, it may be used as a catalytic burner, whereby auxiliary heating is made possible as well.

The disadvantage of this solution is that it involves very cost-intensive technology. Electrical heating of the catalytic converter is required. If the catalytic converter is provided with an integrated heat exchanger, then its thermal mass is very large. This has corresponding negative effects on the heating-up rate and on the electrical energy required for this purpose. During cooling, as a result of the heat exchanger, there is the danger that the necessary reaction temperature is not attained and thereby a complete conversion of the harmful substances is not possible. However, if the heat exchanger is placed behind the catalytic converter instead, there exists the danger that in the case of fuel flooding, the catalyst can be thermally destroyed due to the high exothermal effects.

DE 43 40 463 A1 also describes the use of an exhaust device for heating a vehicle. Before the catalytic converter, a flame burner is provided which produces hot exhaust gases and assures the operational readiness of the catalyst as a result of the heating. To use the burner to heat the vehicle, a heat exchanger is provided which removes the energy from the exhaust gas flow between the burner and the catalytic converter. Also, downstream with respect to the catalytic converter, a heat exchanger may be provided.

SUMMARY OF THE INVENTION

An object of the present invention is to provide an additional heater for motor vehicles with internal combustion engines which makes possible the use of a catalytic converter as a catalytic burner and simultaneously makes it possible to safely prevent thermal destruction of the catalyst without a great deal of regulation expenditure.

This and other objects of the invention are achieved through using an auxiliary heating arrangement for a motor vehicle with an internal combustion engine containing a converter housing which is built into the exhaust line of the motor vehicle and contains an emission control catalyst as well as a heat exchanger integrated in the converter housing located before and/or after the catalyst and an apparatus integrated in the exhaust line located before or upstream of the catalyst for the purpose of injecting a fuel/air mixture, wherein the emission control catalyst contains multiple flow paths for the exhaust gas from the exhaust gas inlet surface towards the outlet surface. The auxiliary heating arrangement is characterized in that the catalyst has at least one radiant surface and the heat exchanger has thermal radiation exchange surfaces which can exchange thermal radiation with the radiant surfaces of the catalyst as well as in a free exchange of heat with the exhaust gas. It is a feature of the invention that the ratio of the radiant surface area of the catalyst with respect to its remaining surface area ranges from 0.5 to 50, preferably from 2 to 10. Preferably, a monolithic exhaust gas purification catalyst is used.

The term "radiant surfaces" as used herein denotes those areas of the surface of the monolithic catalyst where thermal radiation is not hindered by brackets or insulating mats. As a rule, these are the inlet and outlet surfaces for the emission control.

The monolithic catalysts can vary in their geometry. For this reason, the locations such as "behind the catalyst" or "in front of the catalyst" always refer to the direction of flow of the exhaust gas; i.e. downstream or upstream, respectively.

For the auxiliary heating of the passenger compartment, in accordance with the invention, the remaining heat in the motor's exhaust gas as well as the reaction heat being freely released by the catalyst are utilized. For this purpose, the emission control converter present in each new vehicle is combined with one or several indirect heat exchangers which withdraw heat from the exhaust gas and transfer it to a heat-conductive medium. This may, for example, involve fresh air for the passenger compartment which is heated in this manner. In the case of vehicles which are water-cooled, it is advantageous to connect the heat exchangers of the auxiliary heating into the cooling water cycle.

In front of the catalyst, i.e. upstream, an apparatus for injecting a fuel/air mixture into the exhaust gas line is provided. Injection occurs when the exhaust gas heat and the heat being released by the catalyst no longer suffices during the conversion of harmful agents in order to make available the amount of heat required for heating the motor vehicle. In this case, the additionally injected fuel/air mixture is catalytically burned by the catalytic converter.

BRIEF DESCRIPTION OF THE DRAWINGS

The present invention will be further understood with reference to the accompanying drawings, wherein.

DETAILED DESCRIPTION OF THE DRAWINGS

Figure 1:
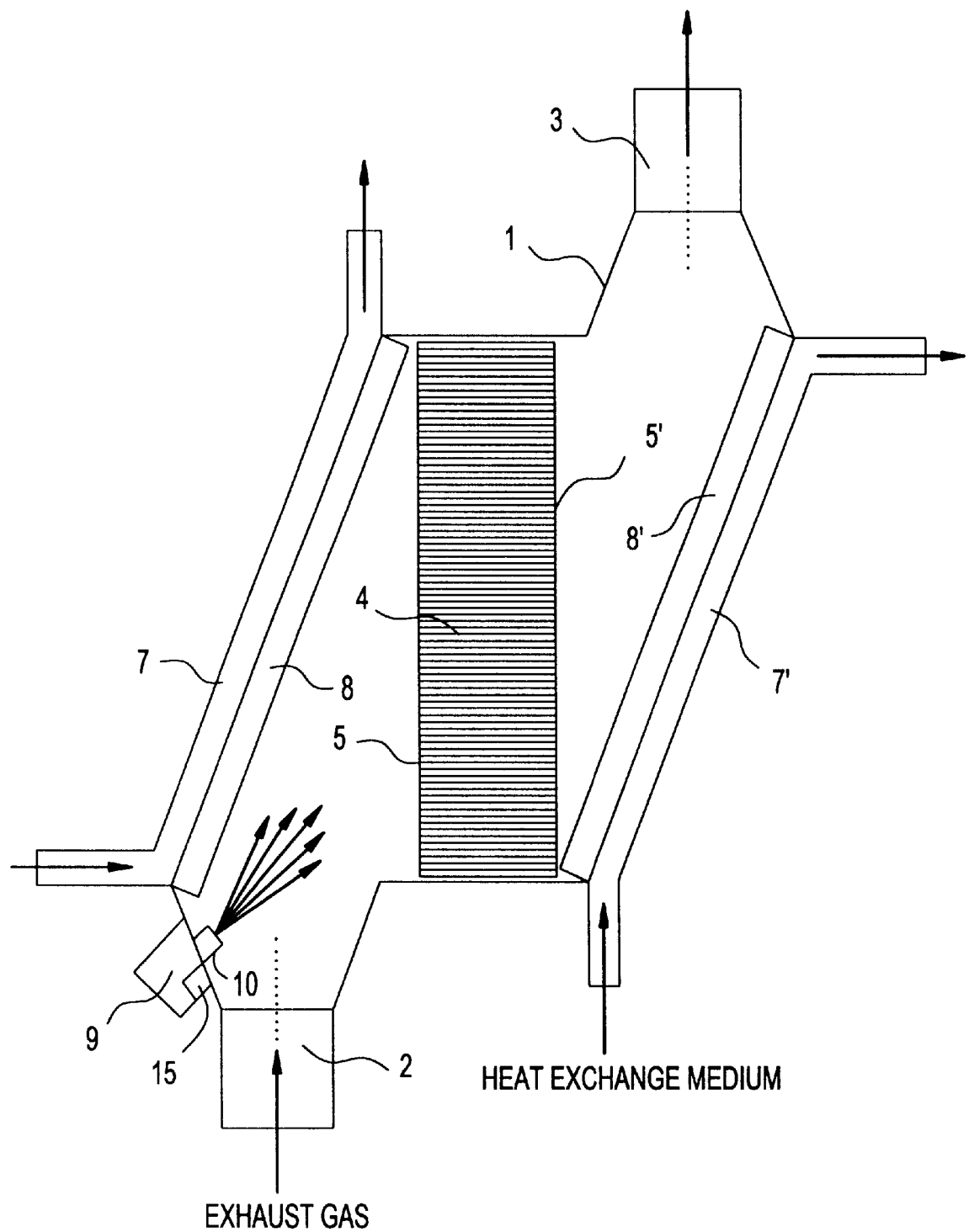
FIG. 1 is a schematic view of an auxiliary heating arrangement of the present invention.

The present invention will now be described in further detail.

In accordance with the invention, the problem of possible thermal damage to the catalyst during operation as a catalytic burner is solved in that at least one of the radiant surfaces of the catalyst can enter into a free radiation exchange with heat exchanger and in this way, a radiant cooling of the catalyst ensues, assuring an inherent safeguarding of the catalyst against thermal overload without additional regulating components.

Therefore, in accordance with the invention, by means of the radiant cooling, the temperature of the catalyst is limited to a maximum value which is harmless to the catalyst. In the case of radiant cooling, the output ΔP, transferred from the radiant surface of the catalyst to the exchange surface of the heat exchanger while taking into consideration the radiation emitted by both surfaces, is given by the relationship:

$$\Delta P = \sigma(\epsilon_a A_a T_a^4 - \epsilon_w A_w T_w^4).$$

$\sigma = 5.67 \cdot 10^{-8} Wm^{-2} K^{-4}$ is the Stefan-Boltzmann constant. The coefficient $\epsilon$ describes the degree of absorption, A the surface and T the absolute temperature of the radiation-emitting surface. The index "a" represents the radiant surfaces of the catalyst, and the index "w" represents the exchange surface of the heat exchanger.

Therefore, while the temperature $T_w$ of the heat exchanger medium remains constant, ΔP rises by approximately the fourth power of the temperature $T_a$ of the radiant surface of the catalyst. In this way, during high temperatures, substantially more heat is transferred than in the case of low temperatures. The radiant cooling protects the catalyst in particular when it is operated as a catalytic burner for the purpose of increasing the heat output.

To ensure that the radiant cooling can effectively protect the catalyst against thermal destruction, it should contain as large a radiant surface area ($A_a$) when compared with its remaining surface area (nonradiant or thermally insulated surfaces) as possible. Since, as a rule, the radiant surfaces of the catalyst will be its inlet and outlet face surfaces for the exhaust gas, this means, regardless of the shape of the catalyst monolith, that the distance between the inlet and outlet face surfaces should be relatively small with respect to the lateral dimension of the catalyst monolith. Good conditions for radiant cooling are given when the ratio of the radiant face surface area to the remaining surface of the catalyst ranges from 0.5 to 100, preferably from 2 to 10. If catalyst networks are used, the value of 100 can clearly be exceeded.

In the actual case of a catalytic element in the form of a circular cylinder with flow channels which are aligned parallel to the cylinder axis, the two face surfaces perpendicular to the cylinder axis form the radiant surfaces. The outer cylindrical cover surface of such a catalytic element is mounted inside the converter by means of a thermally insulating mat, so that effective thermal radiation from this surface is possible only in a greatly limited manner. For such a catalyst, an aspect ratio of 0.5 (front surfaces to the cover surface) signifies that the length of the circular cylinder is equal to its diameter. For smaller ratios, the radiant cooling loses more and more intensity via the front surfaces. For this reason, disk-like catalytic elements with aspect ratios of more than 2 are preferably used. The preferred aspect ratio has an upper limit defined only by the desired intensity of the radiant cooling and by the deterioration of the mechanical stability of the catalyst as the aspect ratio increases. Above a ratio of 10, the mechanical stability of a disk-like catalytic element made of a ceramic material is no longer guaranteed without additional support measures.

As catalysts, all embodiments known from the state of the art are suitable. Monolithic catalysts with an open-pore filter structure are suitable, such as foam materials, networks or fiber structures having irregular and interconnected flow paths for the exhaust gas from the inlet side to the outlet side, or the previously mentioned honeycomb catalysts with regular flow paths for the exhaust gas in the form of parallel flow channels, which are used as so-called wall-flow filters with alternatingly plugged flow channels, as well as honeycomb elements with flow channels which are open on both sides can also be used.

The emissivity (or the degree of absorption) of open-pore catalyst monoliths and also the emissivity of the parallel-aligned flow channels of honeycomb elements is clearly greater than the emissivity of the catalyst coating. In the case of honeycomb elements, a good emissivity is nearly independent of the wall material and is given when the ratio of the channel radius with respect to the channel length is smaller than 0.1 (the same is also applicable in the case of square channels).

By using the catalyst as a catalytic converter burner, the fuel consumption is increased. However, compared to conventional auxiliary heating based on a burner, fuel savings is realized nonetheless since only a portion of the required heat has to be produced by means of additional fuel injection. The remaining part is provided by means of the heat content of the exhaust gas and the reaction heat released during the conversion of the harmful substances in the exhaust stream.

Since the injected fuel is burned catalytically by the catalytic converter at temperatures below 1300° C., the formation of nitric oxides occurring in connection with flame burners is avoided. Thus, the nitric oxide emissions, as compared with conventional auxiliary heating, are clearly reduced and extensively determined by the nitrogen components found in the fuel.

In a preferred embodiment of the auxiliary heating, the device for injecting the fuel/air mixture is provided with an ignition device, so that it may also be operated as a flame burner with homogenous burning of the fuel/air mixture. This technique is used in order to heat the catalyst from a cold start to its working temperature. After the working temperature of the catalyst is reached, the flame is extinguished by means of a brief interruption in the fuel supply. If necessary, the fuel supply is subsequently opened again in order to supply the catalyst with the fuel/air mixture for catalytic combustion.

In addition to a very rapid heating of the passenger compartment, this variation of the auxiliary heating has the advantage that the catalyst very rapidly attains its full output capacity during cold starting. The hydrocarbon emissions typically observed during cold starting, due to a still insufficient temperature of the catalyst, are substantially reduced thereby. Due to the operation of the device for injecting the fuel/air mixture during cold starting as a flame burner, additional nitric oxides are produced in this operational phase which, due to the not yet attained working temperature of the catalyst, cannot be completely converted. However, since this operational phase is merely of a short duration and the emissions of such a burner are comparatively low, the total outcome of the conversion of harmful substances by means of the converter does not suffer substantially.

If the function of heating the passenger compartment while the motor is not running and the possibility of preheating the catalyst for reducing cold start emissions is omitted, a starting device for the operation of the catalytic burner is not necessary. At that point, the system operates only as auxiliary heating and an element for removing heat from the hot exhaust gas.

Preferably, motor fuel is introduced into the converter upstream of the catalyst for catalytic combustion. However, also other fuels, such as natural gas or hydrogen may be used. The use of hydrogen has the advantage that homogenous combustion is required only at temperatures below 0°. Above 0° C., hydrogen may already be burned catalytically by the catalyst.

The auxiliary heating has additional components for operation, such as temperature sensors, air and fuel pumps and electronic control elements which assure a correct chronological sequence of the various operating phases of the auxiliary heating. Although necessary for the operation of the auxiliary heating, these components, however, are not essential to the invention and are well within the scope of those skilled in the art. In the case of new vehicles, the control of the auxiliary heating may be integrated into the electronic vehicle controls.

The following examples serve to further illustrate and describe the present invention in various embodiments.

EXAMPLE 1

FIG. 1 shows auxiliary heating with a catalyst monolith in the form of a disk. Catalytic converter 1 is provided with the connection pieces 2 and 3 for the inlet and outlet, respectively, exhaust lines. The emission control catalyst 4 has a plurality of parallel flow channels for the exhaust gas. The disk has a front face surface 5 facing the exhaust gas inlet 2 and a front face surface 5' oriented toward the exhaust gas outlet 3 of the catalyst. The heat exchanger 7' which transfers the remaining heat of the exhaust gas and the reaction heat released by the catalyst to a heat transfer medium, indicated by the small arrow, for the purpose of heating the passenger compartment is located in the direction of flow of the exhaust gas (indicated by large arrows) downstream from the catalyst. In order to be able to effectively remove heat from the exhaust gas, the heat exchanger has, on its exchange surface facing the catalyst, ribs 8' which are arranged parallel with respect to the flow direction of the exhaust gas. The front face surface 5' of the catalyst 4 and the exchange surface 8' of the heat exchanger are arranged with respect to each other in such a way that they may freely exchange radiation.

For the injection of the fuel/air mixture, the converter 1 has in the flow direction of the exhaust gas indicated by the large arrows, upstream of the catalyst, an apparatus 9 with a nozzle 10. In order to be able to start heating the passenger compartment before the vehicle is running or during the cold starting phase, this apparatus is provided with an ignition device, with which the fuel/air mixture can be ignited. Here, the mixture burns in an open flame and heats the catalyst to its working temperature of approximately 300 to 500° C. After the working temperature of the catalyst has been reached, the flame can be extinguished. Subsequently, the additional generation of heat takes place by means of the catalytic combustion of the fuel/air mixture introduced with the nozzle 10 into the catalytic converter 1. A second heat exchanger 7 is provided in the converter housing 1 before the catalyst 4 and having ribs 8 extending into the converter.

When a circular catalytic disk with a volume of 1000 $cm^3$ and a thickness of 2.5 cm is used, the ratio of the two front radiant surfaces to the cover surface is 6.3. In this case, the diameter of the disk is approximately 22.5 cm.

EXAMPLE 2

Figure 2:
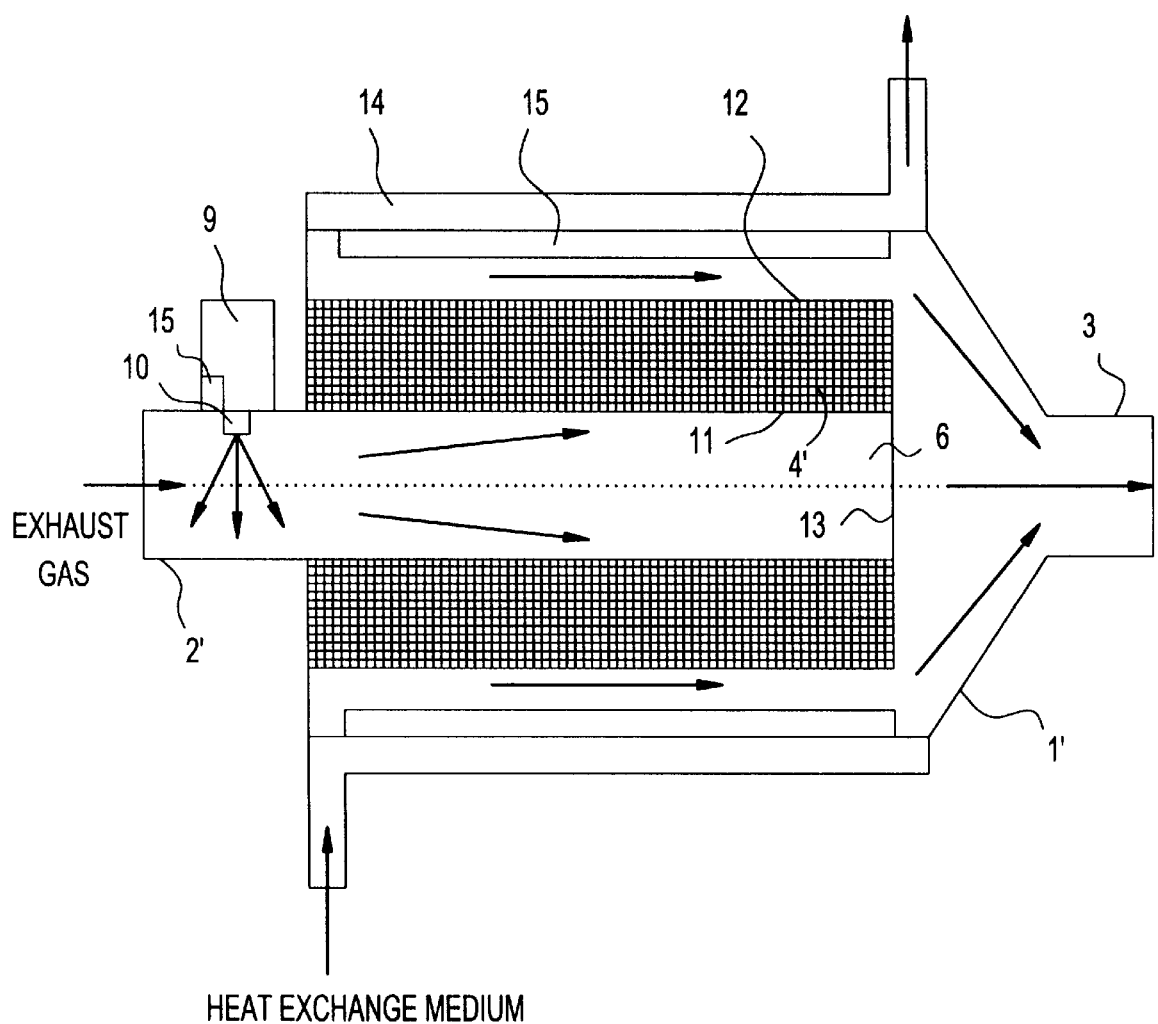
FIG. 2 is a schematic view of another embodiment of an auxiliary heating arrangement of the present invention.

FIG. 2 shows an additional embodiment of the auxiliary heating. In this embodiment catalyst 4' consists of a ceramic foam carrier in the form of a hollow cylinder 6. It is concentrically arranged inside the converter housing 1'. The exhaust gas enters through the inlet 2' and is directed from the inside of the hollow cylinder 6 to the catalyst 4' via the inlet connection piece 2' and flows through the catalyst in a radial direction towards the outside. The entry surface for the exhaust gas into the catalyst is the inner covering surface 11 of the hollow cylinder 6 and the outlet surface is formed by the outer cover surface 12 of the hollow cylinder 6. In order to force the exhaust gas to flow radially toward the outside through the hollow cylinder, it is closed off at the end by means of a plate 13. The converter housing 11 has a double-walled construction for the formation of a heat exchanger 14 which surrounds the converter. Through the hollow space formed, a heat transfer medium is provided for the purpose of removing the heat. The flow of the heat transfer medium is shown by the arrows. Longitudinal ribs 15 are placed onto the inner wall of the converter housing in order to withdraw heat from the exhaust gas. Radiant cooling of the catalyst takes place from the outer cover surface 12 of the catalyst to the surrounding inner wall surface of the converter housing fitted with the plurality of cooling ribs 15. As in Example 1, a device 9 for injecting fuel into the exhaust gas flow by a nozzle 10 is provided.

When the catalyst volume is the same as in Example 1 and has an inner diameter of 5 cm and an outer diameter of 10 cm, the hollow cylinder has a length of approximately 17 cm. In this embodiment, the thickness of the catalyst is 2.5 cm, as in Example 1. The ratio of its radiant outer cover surface with respect to the remaining surfaces (2 front surfaces and an inner cover surface) is 1.4. Also, with this auxiliary heating, it is possible to position a heat exchanger which is located in front of the catalyst. By means of corresponding structural steps, it must be arranged inside the hollow cylinder. In this case, the inner cover surface of the hollow cylinder is a radiant surface. The surface ratio increases accordingly. Since a hollow cylinder has good stability properties, the thickness of the catalyst with respect to a simple disk may be reduced very clearly. Aspect ratios of up to 100 are therefore easily accessible. When catalyst networks are used, aspect ratios of clearly more than 100 are achieved.

Further variations and modifications will be apparent to those skilled in the art from the foregoing and are intended to be encompassed by the claims appended hereto.

German priority 197 21 439.8 is relied on and incorporated herein by reference.

We claim:

1. An auxiliary heating system for a motor vehicle with an internal combustion engine, comprising:
   a catalytic converter housing having an upstream direction and a downstream direction relative to flow of exhaust gas therethrough;
   an emission control catalyst located in the converter housing, wherein the emission control catalyst has an exhaust inlet surface and an exhaust outlet surface and contains multiple exhaust gas flow paths defined between the inlet surface and the outlet surface;
   a heat exchanger engaged with the converter housing, wherein the heat exchanger has a heat exchange surface which exchanges heat with the exhaust gas and freely exchanges radiated heat from at least one of the inlet surface or the outlet surface of the emission control catalyst; and
   a fuel/air mixture injector for injecting a fuel/air mixture into the converter housing,
      wherein a ratio of a surface area of the catalyst exchanging radiated heat with the heat exchange surface to a remaining surface area of the catalyst ranges from 0.5 to 100.

2. The auxiliary heating system according to claim 1 wherein said ratio is from 2 to 10.

3. The auxiliary heating system, in accordance with claim 1, wherein the injector has an ignition device.

4. The auxiliary heating system, in accordance with claim 1, wherein the heat exchanger includes an exhaust gas/water heat exchanger.

5. An automotive vehicle having the auxiliary heating system of claim 1.

6. The auxiliary heating system in accordance with claim 1, wherein the heat exchanger is an exhaust gas/air heat exchanger.

7. The auxiliary heating system in accordance with claim 1, wherein the heat exchange surface is arranged to freely exchange radiated heat from the inlet surface of the emission control catalyst.

8. The auxiliary heating system in accordance with claim 1, wherein the heat exchange surface is arranged to freely exchange radiated heat from the outlet surface of the emission control catalyst.

9. The auxiliary heating system in accordance with claim 1, wherein the heat exchanger provides heat to warm a passenger compartment of the motor vehicle.

10. An automotive vehicle having the auxiliary heating system of claim 9.

11. An auxiliary heating system for a motor vehicle with an internal combustion engine, comprising:
    a catalytic converter housing having an upstream direction and a downstream direction relative to flow of exhaust gas therethrough;
    an emission control catalyst located in the converter housing, wherein the emission control catalyst has an exhaust inlet surface and an exhaust outlet surface and contains multiple exhaust gas flow paths defined between the inlet surface and the outlet surface;
    a heat exchange means engaged with the converter housing, wherein the heat exchange means includes: (a) a first heat exchange surface which exchanges heat with the exhaust gas and freely exchanges radiated heat from the inlet surface of the emission control catalyst, and (b) a second heat exchange surface which exchanges heat with the exhaust gas and freely exchanges radiated heat from the outlet surface of the emission control catalyst; and
    a fuel/air mixture injector for injecting a fuel/air mixture into the converter housing,
       wherein a ratio of a surface area of the catalyst exchanging radiated heat with the first and second heat exchange surfaces to a remaining surface area of the catalyst ranges from 0.5 to 100.

12. The auxiliary heating system according to claim 11, wherein said ratio is from 2 to 10.

13. The auxiliary heating system according to claim 11, wherein the injector has an ignition device.

14. The auxiliary heating system in accordance with claim 11, wherein the heat exchange means includes an exhaust gas/water heat exchanger.

15. The auxiliary heating system in accordance with claim 11, wherein the heat exchange means includes an exhaust gas/air heat exchanger.

16. The auxiliary heating system in accordance with claim 11, wherein the heat exchange means provides heat to warm a passenger compartment of the motor vehicle.

17. An automotive vehicle having the auxiliary heating system of claim 16.

18. An automotive vehicle having the auxiliary heating system of claim 11.

* * * * *